US011930345B2

(12) United States Patent
Jiang et al.

(10) Patent No.: US 11,930,345 B2
(45) Date of Patent: Mar. 12, 2024

(54) SPEAKER AND TERMINAL DEVICE

(71) Applicant: VIVO MOBILE COMMUNICATION CO., LTD., Guangdong (CN)

(72) Inventors: Guozhu Jiang, Chang'an Dongguan (CN); Lifeng Long, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 222 days.

(21) Appl. No.: 17/525,928

(22) Filed: Nov. 14, 2021

(65) Prior Publication Data

US 2022/0078559 A1 Mar. 10, 2022

Related U.S. Application Data

(63) Continuation of application No. PCT/CN2020/085671, filed on Apr. 20, 2020.

(30) Foreign Application Priority Data

May 15, 2019 (CN) ........................ 201910402731.1

(51) Int. Cl.
*H04R 9/06* (2006.01)
*H04R 9/02* (2006.01)
*H04R 9/18* (2006.01)

(52) U.S. Cl.
CPC ............... *H04R 9/06* (2013.01); *H04R 9/025* (2013.01); *H04R 9/18* (2013.01)

(58) Field of Classification Search
CPC . H04R 1/02; H04R 1/021; H04R 1/28; H04R 1/2873; H04R 1/345; H04R 7/12; H04R 7/127; H04R 9/02; H04R 9/025; H04R 9/06; H04R 9/18; H04R 2209/22; H04R 2400/11; H04R 2499/11
USPC ........................................... 381/87, 332–335
See application file for complete search history.

(56) References Cited

U.S. PATENT DOCUMENTS

| | | | |
|---|---|---|---|
| 2009/0136055 A1 | 5/2009 | Grell et al. |
| 2009/0323995 A1 | 12/2009 | Sibbald |
| 2015/0244845 A1 | 8/2015 | Ko et al. |
| 2016/0295316 A1 | 10/2016 | Shao et al. |
| 2019/0014417 A1 | 1/2019 | Qin et al. |
| 2021/0014587 A1 | 1/2021 | Cai et al. |

FOREIGN PATENT DOCUMENTS

| | | |
|---|---|---|
| CN | 106101954 A | 11/2016 |
| CN | 106101956 A | 11/2016 |
| CN | 106162459 A | 11/2016 |
| CN | 205793226 U | 12/2016 |
| CN | 206481455 U | 9/2017 |

(Continued)

OTHER PUBLICATIONS

European Search Report dated Jun. 1, 2022 as received in application No. 20805394.2.

(Continued)

*Primary Examiner* — Harry S Hong
(74) *Attorney, Agent, or Firm* — Maschoff Brennan

(57) ABSTRACT

A speaker is provided, including a speaker housing and a speaker body. The speaker body is connected to the speaker housing, the speaker body and the speaker housing form a cavity, the cavity includes a first inner cavity and a second inner cavity, and the first inner cavity and the second inner cavity are connected through a connecting hole.

18 Claims, 2 Drawing Sheets

(56) References Cited

FOREIGN PATENT DOCUMENTS

| | | | |
|---|---|---|---|
| CN | 108391188 | A | 8/2018 |
| CN | 110177323 | A | 8/2019 |
| KR | 20160108313 | A | 9/2016 |

OTHER PUBLICATIONS

Chinese Office Action dated May 20, 2020 as received in application No. 201910402731.1.
Chinese Office Action dated Aug. 26, 2020 as received in application No. 201910402731.1.
Internation Search Report and Written Opinion dated Nov. 25, 2021 as received in application No. PCT/CN2020/085671.
Korean Office Action issued in corresponding application No. 10-2021-7038645, dated Jul. 31, 2023.

SPEAKER AND TERMINAL DEVICE

CROSS-REFERENCE TO RELATED APPLICATIONS

This application is continuation application of PCT International Application No. PCT/CN2020/085671 filed on Apr. 20, 2020, which claims priority to Chinese Patent Application No. 201910402731.1 filed in China on May 15, 2019, the disclosures of which are incorporated herein by reference in their entireties.

TECHNICAL FIELD

The present disclosure relates to the field of communications device technologies, and in particular, to a speaker and a terminal device.

BACKGROUND

As users' needs increase, performance of terminal devices is continuously being optimized. Current terminal devices have growing requirements for appearance design. An increasing number of speakers have sound output holes arranged on side faces of the terminal devices. Therefore, a sound guide channel is needed to connect a front cavity of the speaker and the sound output hole. Such a structure is likely to cause resonance of the front cavity of the speaker, making the speaker form a relatively high high-frequency resonance peak at a frequency band of 3.5 kHz to 6 kHz. This frequency band belongs to a range relatively sensitive to a human ear, and the high-frequency resonance peak causes a relatively harsh sense of hearing, thereby affecting use experience of a user.

Currently, a length of the sound output channel is usually extended to form a secondary resonance in the industry, to disperse energy of the high-frequency resonance peak of the front cavity. However, a longer sound output channel occupies larger space, thereby affecting arrangement of a battery in the terminal device.

SUMMARY

The present disclosure discloses a speaker and a terminal device.

A speaker is provided, including a speaker housing and a speaker body. The speaker body is connected to the speaker housing, the speaker body and the speaker housing form a cavity, the cavity includes a first inner cavity and a second inner cavity, and the first inner cavity and the second inner cavity are connected through a connecting hole.

Optionally, in the speaker, the speaker body and the speaker housing form the first inner cavity, and the speaker housing has the second inner cavity.

Optionally, in the speaker, the first inner cavity includes a first sub-cavity and a sound output channel, the sound output channel is connected to the first sub-cavity, and the first sub-cavity is connected to the second inner cavity through the connecting hole.

Optionally, in the speaker, the speaker housing includes a first housing and a second housing that is detachably connected to the first housing, the speaker body is disposed between the first housing and the second housing, the first sub-cavity is formed between the speaker body and the second housing, and the second housing is provided with the sound output channel.

Optionally, in the speaker, the second housing includes a housing body, a support sheet, and a sealing sheet, the support sheet is disposed on the housing body, the support sheet has a first groove recessed toward the speaker body, the sealing sheet covers an opening of the first groove and together with the first groove, forms the second inner cavity, and an inner wall of the first groove is provided with the connecting hole.

Optionally, in the speaker, the housing body is provided with a first mounting hole, the support sheet is arranged in the first mounting hole, and a surface on which the opening of the first groove on the support sheet is located is coplanar with an outer surface of the housing body.

Optionally, in the speaker, the surface on which the opening of the first groove on the support sheet is located is coplanar with an outer surface of the sealing sheet.

Optionally, in the speaker, a support platform is arranged in the first groove, and the sealing sheet is pasted on the support platform.

Optionally, in the speaker, the support sheet is a steel sheet for support.

Optionally, in the speaker, the speaker body includes a diaphragm and a dome, the dome has a second groove that matches a shape of the first groove, and the dome fits the diaphragm.

Optionally, in the speaker, the speaker body includes an inner magnet and a magnetic conductive sheet arranged on the inner magnet, the magnetic conductive sheet is arranged on one side, facing the diaphragm, of the inner magnet, and a third groove is arranged in an area through which the magnetic conductive sheet is opposite to the second groove.

Optionally, in the speaker, the support sheet is provided with a second mounting hole, the second mounting hole is equipped with a tube member, and the tube member connects the first sub-cavity and the second inner cavity.

Optionally, in the speaker, a fastening member is fastened on the support sheet, the fastening member has a threaded hole corresponding to the second mounting hole, an outer wall of the tube member has threads, and the tube member penetrates through the support sheet by using the second mounting hole and is screwed into the threaded hole.

Optionally, in the speaker, the second mounting hole is arranged in a center of a bottom wall, facing the opening, of the first groove.

Optionally, in the speaker, the first inner cavity includes a first sub-cavity and a sound output channel, the sound output channel is connected to the first sub-cavity, and the sound output channel is connected to the second inner cavity through the connecting hole.

Optionally, in the speaker, the speaker body has the second inner cavity.

A terminal device is provided, including the speaker as described above.

BRIEF DESCRIPTION OF DRAWINGS

The accompanying drawings described herein are used to provide a further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings.

Reference signs:

100: speaker housing, 110: first housing, 120: second housing, 121: sound output channel, 122: housing body, 1221: first mounting hole, 123: support sheet, 1231: first groove, 1232: support platform, 124: sealing sheet, 130: tube member, 140: fastening member;

200: speaker body, 210: diaphragm, 220: dome, 221: second groove, 230: inner magnet, 240: magnetic conductive sheet, 241: third groove, 250: outer magnet, 260: energized coil; and A: first sub-cavity, B: second inner cavity.

DESCRIPTION OF EMBODIMENTS

To make the objectives, technical solutions, and advantages of the present disclosure clearer, the following clearly describes the technical solutions in the present disclosure with reference to specific embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

The technical solutions disclosed in the embodiments of the present disclosure are described in detail with reference to the accompanying drawings.

Figure 1:
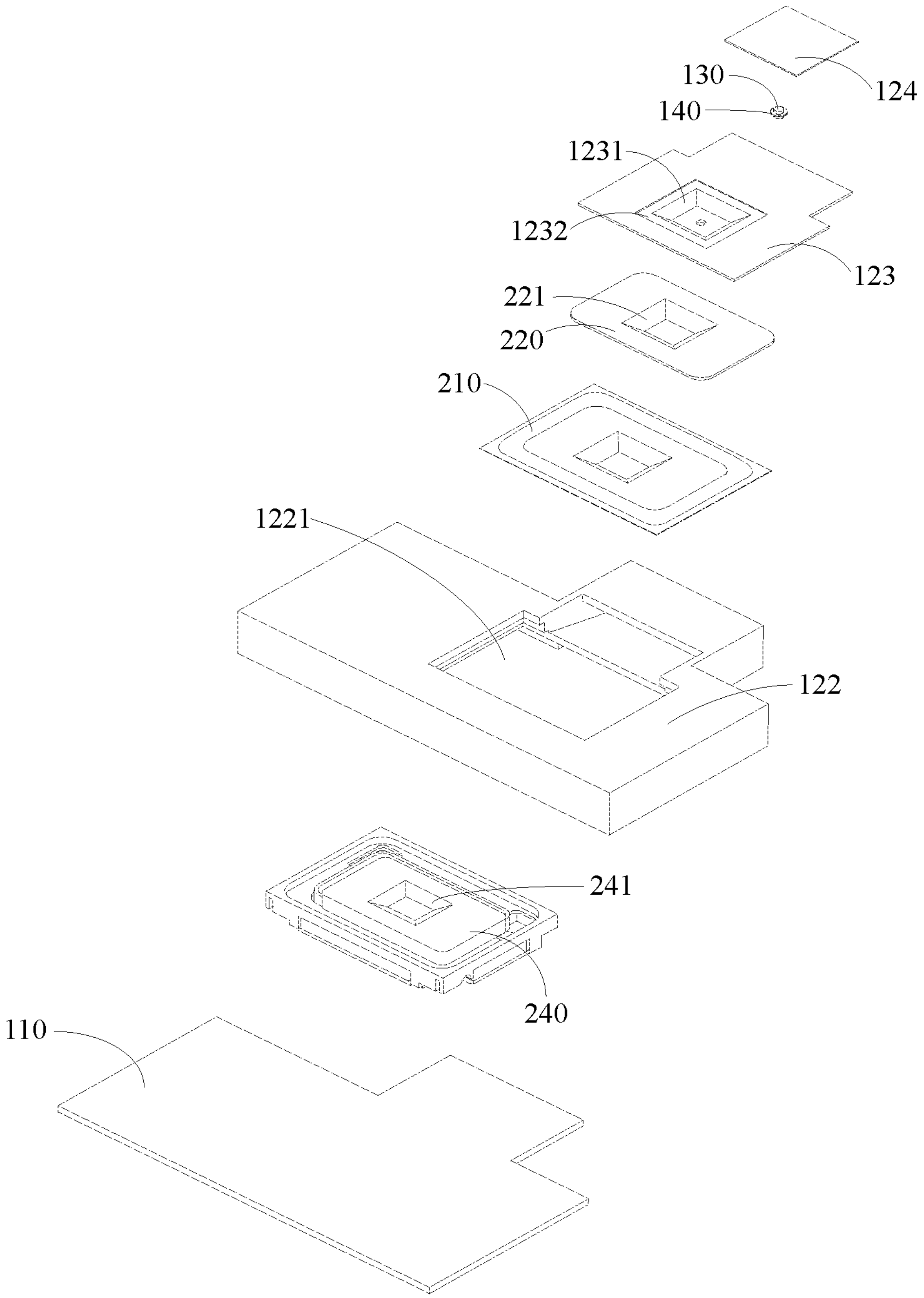
FIG. 1 is a schematic structural exploded view of a speaker disclosed in an embodiment of the present disclosure.
Figure 2:
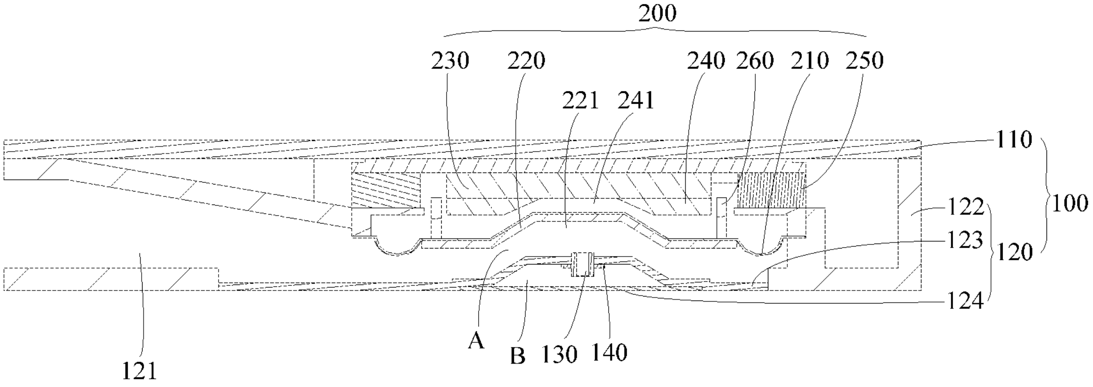
FIG. 2 is a cutaway drawing of a speaker disclosed in an embodiment of the present disclosure.
Figure 3:
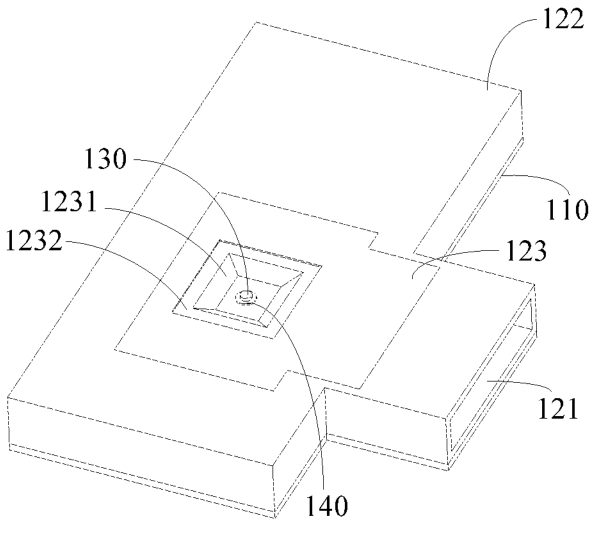
FIG. 3 is a schematic diagram of a three-dimensional structure of a speaker disclosed in an embodiment of the present disclosure.

Refer to FIG. 1 to FIG. 3. An embodiment of the present disclosure discloses a speaker, and the disclosed speaker may be applied to a terminal device. The speaker disclosed in this embodiment of the present disclosure includes a speaker housing 100 and a speaker body 200.

The speaker body 200 is a main component of the speaker, and the speaker housing 100 can provide an installation position for the speaker body 200. In this embodiment of the present disclosure, the speaker body 200 is connected to the speaker housing 100, and the speaker body 200 and the speaker housing 100 form a cavity of the speaker. The cavity includes a first inner cavity and a second inner cavity B. Specifically, the first inner cavity and the second inner cavity B are connected through a connecting hole.

In the speaker disclosed in this embodiment of the present disclosure, the speaker body 200 and the speaker housing 100 form the cavity. The cavity includes the first inner cavity and the second inner cavity B, and the second inner cavity B is connected to the first inner cavity through the connecting hole, so that the first inner cavity and the second inner cavity B form a parallel resonant structure. When a resonance frequency of the parallel resonant structure is close to a resonance frequency of a front cavity of the speaker, notch filtering can be formed to suppress a high-frequency resonance peak, thereby avoiding relatively harsh sense of hearing caused because the resonance peak cannot be suppressed, and thereby improving use experience of a user.

Meanwhile, the improvement of the speaker disclosed in this embodiment of the present disclosure to the speaker in the related art does not affect a rear cavity of the speaker, and therefore does not affect audio performance of the speaker.

In order to improve a resonance effect without affecting an overall volume of the speaker, in an optional scheme, a volume of the second inner cavity B may be less than a volume of the first inner cavity.

Specifically, the speaker body 200 and the speaker housing 100 may form the first inner cavity, and the speaker housing 100 may have the second inner cavity B. The second inner cavity B is not limited to being arranged on the speaker housing 100. Specifically, the speaker body 200 may have the second inner cavity B.

In this embodiment of the present disclosure, the first inner cavity may include a first sub-cavity A and a sound output channel 121. The sound output channel 121 is connected to the first sub-cavity A, and the first sub-cavity A may be considered as a front cavity of the speaker. During operation of the speaker, the speaker body 200 pushes air in the first sub-cavity A to vibrate to generate sound, and the generated sound can be emitted from the sound output channel 121 to the outside of the terminal device, so that sound emitting of the speaker is finally implemented.

As described above, the first inner cavity and the second inner cavity B may be connected through the connecting hole, and the speaker body 200 and the speaker housing 100 form the first inner cavity. In addition, based on a premise that the first inner cavity includes the first sub-cavity A and the sound output channel 121, the second inner cavity B can be connected to the first sub-cavity A through the connecting hole, so as to connect to the first inner cavity. Alternatively, the second inner cavity B may be connected to the sound output channel 121 through the connecting hole, so as to connect to the first inner cavity. Specifically, this embodiment of the present disclosure does not limit a specific manner in which the first inner cavity and the second inner cavity are connected through the connecting hole.

To facilitate assembly of the speaker, in an optional scheme, the speaker housing 100 may include a first housing 110 and a second housing 120, and the first housing 110 is connected to the second housing 120. Specifically, the first housing 110 and the second housing 120 are detachably fastened and connected. Based on a premise that the speaker housing 100 includes the first housing 110 and the second housing 120, the speaker body 200 may be disposed between the first housing 110 and the second housing 120. Connection to the first housing 110 and the second housing 120 can implement fastening of the speaker body 200, and further implement installation of the speaker body 200 on the speaker housing 100.

The speaker body 200 is connected to the second housing 120 to form the first sub-cavity A, the speaker housing 100 has the sound output channel 121, the sound output channel 121 is connected to the first sub-cavity A, and after the speaker body 200 is connected to the second housing 120, the second housing 120 and the speaker body 200 form a first inner cavity.

Because a structure of the speaker body 200 is relatively complex, in an optional scheme, the speaker housing 100 has the second inner cavity B. In such a manner, the second inner cavity B is relatively easy to form. Specifically, the second housing 120 may include a housing body 122, a support sheet 123, and a sealing sheet 124. Specifically, the support sheet 123 may be disposed on the housing body 122, and the support sheet 123, the housing body 122, and the speaker body 200 may form the first sub-cavity A. In this embodiment of the present disclosure, the support sheet 123 may have a first groove 1231 recessed toward the speaker body 200, and the sealing sheet 124 covers an opening of the first groove 1231, so that the sealing sheet 124 and the first groove 1231 form the second inner cavity B. An inner wall of the first groove 1231 may be provided with the connecting hole, and the connecting hole connects the first sub-cavity A and the second inner cavity B.

As mentioned above, the second housing 120 may have the sound output channel 121, and the sound output channel 121 may be formed by abutting against the second housing 120 by the first housing 110, or may be arranged on the first housing 110, or arranged on the second housing 120. As shown in FIG. 2, the second housing 120 is provided with the sound output channel 121.

To reduce a thickness of the speaker and thereby reduce space occupied by the speaker, in an optional scheme, the housing body 122 may be provided with a first mounting hole 1221, and the support sheet 123 is arranged in the first mounting hole 1221. The first groove 1231 of the support sheet 123 is recessed from the first mounting hole 1221 to a side on which the speaker body 200 is located. In this case, at least a part of the support sheet 123 is embedded in the first mounting hole 1221 of the housing body 122, thereby reducing a height of the support sheet 123 and the housing body 122 after being stacked.

Specifically, a surface on which the opening of the first groove 1231 on the support sheet 123 is located may be coplanar with an outer surface of the housing body 122, thereby facilitating coplanarity of a part of a surface of the support sheet 123 and the outer surface of the housing body 122, and helping improve appearance performance of the speaker. The outer surface of the housing body 122 can form a part of an appearance surface of the speaker. In this case, the surface on which the opening of the first groove 1231 is located can also form a part of the appearance surface of the speaker.

In an optional scheme, the surface on which the opening of the first groove 1231 on the support sheet 123 is located may be coplanar with an outer surface of the sealing sheet 124, so that the support sheet 123 and the sealing sheet 124, after being installed in place, can be coplanar with the outer surface of the housing body 122. This can undoubtedly further improve the appearance performance, and meanwhile, can reduce an assembly thickness.

To ensure that the opening of the first groove 1231 is completely closed, a support platform 1232 may be arranged in the first groove 1231, and the sealing sheet 124 may be attached to the support platform 1232. Specifically, the sealing sheet 124 may be pasted on the support platform 1232.

In the speaker disclosed in this embodiment of the present disclosure, the support sheet 123 may be a steel sheet for support, and the support sheet 123 has relatively high strength and meanwhile has good deformability. The support sheet 123 may alternatively be a plastic sheet or the like, and a specific material of the support sheet 123 is not limited in this embodiment of the present disclosure.

In the speaker disclosed in this embodiment of the present disclosure, the speaker body 200 may include a diaphragm 210 and a dome 220. During operation of the speaker, the diaphragm 210 vibrates, the dome 220 fits the diaphragm 210, and a density of the dome 220 is greater than a density of the diaphragm 210, so that inertia of the dome 220 is larger. The dome 220 can increase inertia of the diaphragm 210 during vibration, and enhance a vibration effect of the diaphragm 210.

In order not to affect a vibration range of the speaker, in an optional scheme, the dome 220 has a second groove 221 that matches a concave shape of the first groove 1231. The diaphragm 210 fits the dome 220, and a whole formed by the diaphragm 210 and the dome 220 can better avoid the first groove 1231 of the support sheet 123, so that impact of the first groove 1231 on an overall vibration range of the diaphragm 210 and the dome 220 can be mitigated. In addition, the dome 220 has the second groove 221, and the second groove 221 can strengthen rigidity of the dome 220, thereby reducing split vibration of the speaker in a high frequency range, and expanding a frequency bandwidth of the speaker. Obviously, this can further improve performance and sense of hearing of the speaker.

Refer to FIG. 2 again. The speaker body 200 includes an inner magnet 230, an outer magnet 250, and an energized coil 260. The inner magnet 230 and the outer magnet 250 form a magnetic field. The energized coil 260 is disposed in a gap between the inner magnet 230 and the outer magnet 250, and the energized coil 260 is connected to the diaphragm 210. When the energized coil 260 is in an energized state, it is driven by magnetic force to drive the diaphragm 210 to vibrate, thereby pushing air in the first sub-cavity A to vibrate, and finally generating sound.

To achieve a relatively strong driving effect, a magnetic conductive sheet 240 may be arranged on a surface, facing the diaphragm 210, of the inner magnet 230. The magnetic conductive sheet 240 is made of a magnetic conductive material, and has a function of magnetic conduction, so that magnetic force of the inner magnet 230 and the outer magnet 250 applied onto the energized coil 260 is larger. For example, the magnetic conductive sheet 240 may be an iron gasket.

Because a recessed direction of the second groove 221 of the dome 220 is consistent with a recessed direction of the first groove 1231, the recessed direction of the second groove 221 faces the inner magnet 230. In an optional scheme, the magnetic conductive sheet 240 is arranged on one side, facing the diaphragm 210, of the inner magnet 230, and a third groove 241 is arranged in an area through which the magnetic conductive sheet 240 is opposite to the second groove 221. The third groove 241 can better play a role of avoiding vibration of the diaphragm 210 and the dome 220, especially avoiding the dome 220 that has the second groove 221. The third groove 241 is arranged on the magnetic conductive sheet 240, and the third groove 241 is usually located in a sparse magnetic flux area of the magnetic conductive sheet 240. Therefore, arrangement of the third groove 241 on the magnetic conductive sheet 240 has less impact on magnetic conduction performance of the magnetic conductive sheet 240.

The inner wall of the first groove 1231 is provided with the connecting hole, and the connecting hole connects the first sub-cavity A and the second inner cavity B, so that the first inner cavity and the second inner cavity B form a parallel resonant structure. In an optional scheme, the support sheet 123 may be provided with a second mounting hole, the second mounting hole may be equipped with a tube member 130, and the tube member 130 is configured to connect the first sub-cavity A and the second inner cavity B, that is, a central hole of the tube member 130 is the connecting hole described above. In an actual design process, a person skilled in the art can properly design parameters such as a length and a diameter of the tube member 130, so as to adjust a resonance frequency more precisely, so that a resonance frequency of the parallel resonant structure is close to the resonance frequency of the front cavity of the speaker, thereby finally suppressing a resonance peak more precisely. Based on a premise that the resonance frequency of the parallel resonant structure is equal to the resonance frequency of the front cavity of the speaker, the resonance peak can be better suppressed.

Specifically, the tube member 130 may be installed in the second mounting hole in a plurality of manners. For example, the tube member 130 may be installed in the second mounting hole by bonding, welding, or the like. Refer to FIG. 2 again. A fastening member 140 may be fastened on the support sheet 123, the fastening member 140 has a threaded hole corresponding to the second mounting hole. An outer wall of the tube member 130 has threads. The tube member 130 may penetrate through the support sheet 123 by using the second mounting hole and be screwed into the threaded hole. In this case, an operator can screw the tube member 130 to adjust a length of the tube member 130 in the first sub-cavity A and a length of tube member 130 in the second inner cavity B, so as to adjust the parallel resonant structure formed by the first sub-cavity A and the second inner cavity B more finely.

In an optional scheme, the second mounting hole may be arranged in a center of a bottom wall, facing the opening, of the first groove 1231, thereby helping improve vibration balance.

Based on the speaker disclosed in this embodiment of the present disclosure, an embodiment of the present disclosure discloses a terminal device, and the disclosed terminal device includes the speaker described in the foregoing embodiment.

The terminal device disclosed in this embodiment of the present disclosure may be a terminal device such as a mobile phone, a tablet computer, an e-book reader, a game console, a wearable device (such as a smart watch). This embodiment of the present disclosure does not limit a specific type of the terminal device.

The foregoing embodiments of the present disclosure focus on differences between various embodiments. Different optimization features of the various embodiments can be combined to form a better embodiment as long as they are not contradictory. Considering conciseness of description, details are not described herein.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

What is claimed is:

1. A speaker, comprising a speaker housing and a speaker body, wherein the speaker body is connected to the speaker housing, the speaker body and the speaker housing form a cavity, the cavity comprises a first inner cavity and a second inner cavity, and the first inner cavity and the second inner cavity are connected through a connecting hole;

the speaker housing comprises a housing body, a support sheet, and the support sheet is disposed on the housing body, the support sheet has a first groove recessed toward the speaker body; and the support sheet is provided with a second mounting hole, the second mounting hole is arranged in a center of a bottom wall, facing the opening, of the first groove, the second mounting hole is equipped with a tube member, and the tube member connects the first sub-cavity and the second inner cavity.

2. The speaker according to claim 1, wherein the speaker body and the speaker housing form the first inner cavity, and the speaker housing has the second inner cavity.

3. The speaker according to claim 2, wherein the first inner cavity comprises a first sub-cavity and a sound output channel, the sound output channel is connected to the first sub-cavity, and the first sub-cavity is connected to the second inner cavity through the connecting hole.

4. The speaker according to claim 3, wherein the speaker housing comprises a first housing and a second housing that is detachably connected to the first housing, the speaker body is disposed between the first housing and the second housing, the first sub-cavity is formed between the speaker body and the second housing, and the second housing is provided with the sound output channel.

5. The speaker according to claim 4, wherein the second housing comprises a sealing sheet, the sealing sheet covers an opening of the first groove and together with the first groove, forms the second inner cavity, and an inner wall of the first groove is provided with the connecting hole.

6. The speaker according to claim 5, wherein the housing body is provided with a first mounting hole, the support sheet is arranged in the first mounting hole, and a surface on which the opening of the first groove on the support sheet is located is coplanar with an outer surface of the housing body.

7. The speaker according to claim 6, wherein the surface on which the opening of the first groove on the support sheet is located is coplanar with an outer surface of the sealing sheet.

8. The speaker according to claim 5, wherein a support platform is arranged in the first groove, and the sealing sheet is pasted on the support platform.

9. The speaker according to claim 5, wherein the support sheet is a steel sheet for support.

10. The speaker according to claim 5, wherein the speaker body comprises a diaphragm and a dome, the dome has a second groove that matches a shape of the first groove, and the dome fits the diaphragm.

11. The speaker according to claim 10, wherein the speaker body comprises an inner magnet and a magnetic conductive sheet arranged on the inner magnet, the magnetic conductive sheet is arranged on one side, facing the diaphragm, of the inner magnet, and a third groove is arranged in an area through which the magnetic conductive sheet is opposite to the second groove.

12. The speaker according to claim 1, wherein a fastening member is fastened on the support sheet, the fastening member has a threaded hole corresponding to the second mounting hole, an outer wall of the tube member has threads, and the tube member penetrates through the support sheet by using the second mounting hole and is screwed into the threaded hole.

13. The speaker according to claim 2, wherein the first inner cavity comprises a first sub-cavity and a sound output channel, the sound output channel is connected to the first sub-cavity, and the sound output channel is connected to the second inner cavity through the connecting hole.

14. The speaker according to claim 1, wherein the speaker body has the second inner cavity.

15. A terminal device, comprising a speaker, wherein the speaker comprises a speaker housing and a speaker body, the speaker body is connected to the speaker housing, the speaker body and the speaker housing form a cavity, the cavity comprises a first inner cavity and a second inner cavity, and the first inner cavity and the second inner cavity are connected through a connecting hole;

the speaker housing comprises a housing body, a support sheet, and the support sheet is disposed on the housing body, the support sheet has a first groove recessed toward the speaker body; and the support sheet is provided with a second mounting hole, the second mounting hole is arranged in a center of a bottom wall, facing the opening, of the first groove, the second mounting hole is equipped with a tube member, and the tube member connects the first sub-cavity and the second inner cavity.

16. The terminal device according to claim 15, wherein the speaker body and the speaker housing form the first inner cavity, and the speaker housing has the second inner cavity.

17. The terminal device according to claim 16, wherein the first inner cavity comprises a first sub-cavity and a sound output channel, the sound output channel is connected to the first sub-cavity, and the first sub-cavity is connected to the second inner cavity through the connecting hole.

18. The terminal device according to claim 17, wherein the speaker housing comprises a first housing and a second housing that is detachably connected to the first housing, the speaker body is disposed between the first housing and the second housing, the first sub-cavity is formed between the speaker body and the second housing, and the second housing is provided with the sound output channel.

* * * * *